Aug. 14, 1951                    E. FRASER                    2,564,302
                    FLUID TIGHT FITTINGS FOR CABLES
                        Filed Dec. 8, 1948
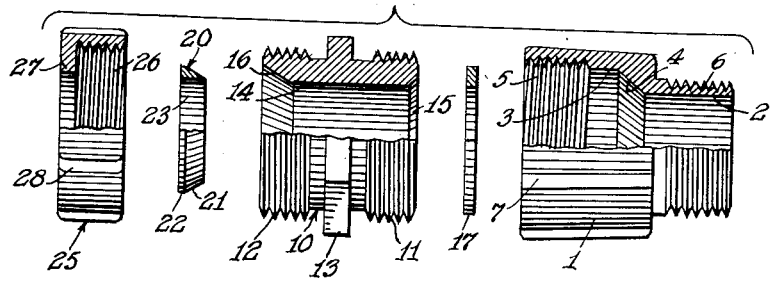
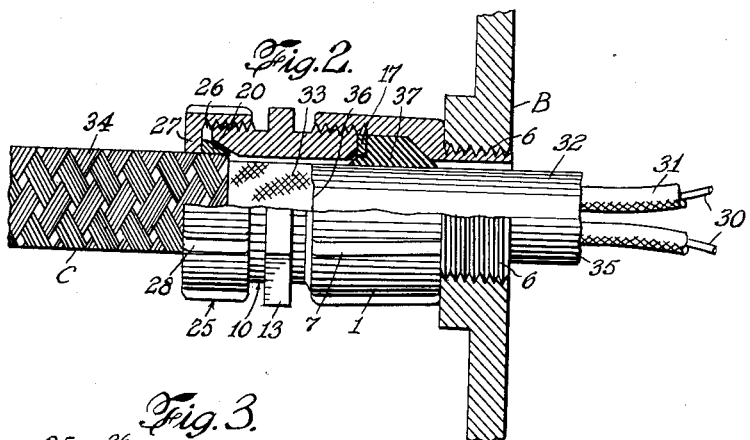
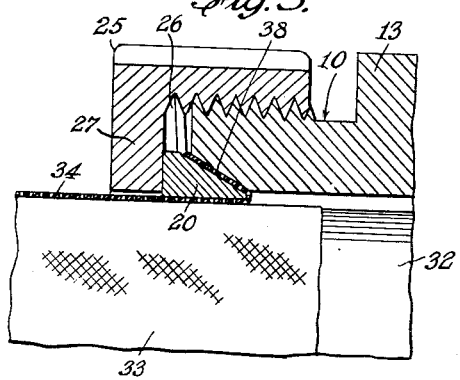
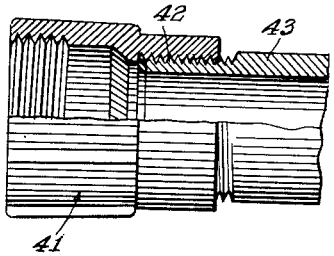
INVENTOR.
EUGENE FRASER
BY
                        ATTORNEY.

Patented Aug. 14, 1951

2,564,302

UNITED STATES PATENT OFFICE 2,564,302

FLUID TIGHT FITTING FOR CABLES

Eugene Fraser, Brooklyn, N. Y.

Application December 8, 1948, Serial No. 64,060

2 Claims. (Cl. 174—65)

The present invention relates to a fitting for making a fluid-tight connection between an equipment enclosure and an electrical cable having an impervious tubular sheath and a flexible armor over the sheath. By fluid-tight is meant that even minute leakage of liquid, gas or vapor is prevented.

A type of electrical cable employed in marine installations comprises one or more insulated electrical conductors enclosed, with or without suitable fillers, in an impervious flexible sheath formed, for example, of lead, or other suitable material, such as plastic or synthetic resin. The sheath is enclosed in a covering of woven or braided metallic fabric or plastic armor which protects the sheath and the cable as a whole against mechanical damage. Similar cable is used in other installations where water tightness or fluid tightness is required. The cable may include additional layers, as, for example, a layer of treated canvas between the sheath and the armor and additional insulating layers inside the sheath. The size and number of the conductors and the nature of the insulation fillers, sheath and armor may vary in accordance with the requirements of the particular installation for which the cable is intended.

When such cable is brought through a watertight bulkhead or into a junction box, outlet box, switch box or the like, or into the waterproof casing or housing of electrical instruments, waterproof lighting fixtures or apparatus, it has been customary to bring the cable in through a stuffing box or gland intended to provide a watertight seal between the cable and the equipment enclosure. In actual practice, however, it has been found that in many instances the connections provided by the fittings presently available are not sufficiently tight to keep out all moisture. Despite the care exercised in installing the fittings in strict accordance with the instruction manual, it has been found, either through failure of equipment during a voyage or in checking a ship after it has been out, that enough moisture has gotten into the equipment enclosures to cause the corrosion and sticking of contacts, the shorting of electrical circuits and serious damage of expensive instruments and equipment. The failure of equipment while at sea is particularly serious since the safety of the ship and of the passengers and crew is, in a large measure, dependent on the proper functioning of the electrical instruments and equipment. Although this problem has existed for a long time and many expedients have been tried to solve it, no satisfactory solution has heretofore been found.

The present invention is directed to the problem of providing a fitting for cable of the above mentioned type, capable of making a connection with an outlet box, switch box or other equipment enclosure which is not merely waterproof in the usual sense of that term but is so tight as to prevent the passage of air or vapor, even when there is a substantial pressure differential between the interior and exterior of the enclosure. By providing a fitting which meets these requirements, the applicant has succeeded where many before him have failed. Tests with the fitting in accordance with the invention have shown that no leakage occurs even under a pressure of 80 pounds of air. Hence an enclosure fitted with this type of fitting would be especially suitable for use in hazardous locations where the above mentioned type cable is used. Moreover, the fitting in accordance with the invention is relatively simple so that it is inexpensive to manufacture and easy to install.

The construction of the fitting in accordance with the present invention and the advantages of this fitting over those heretofore available will be understood from the following description and from the accompanying drawings which show, by way of example, two embodiments of the invention.

In the drawings:

Fig. 1 is an exploded view of the fitting, the lower portion of each part being shown in side elevation and the upper part in longitudinal section.

Fig. 2 shows the assembled fitting in conjunction with a fragmentary showing of a cable and an equipment enclosure, the fitting being shown partially in side elevation and partially in longitudinal section.

Fig. 3 is a fragmentary sectional view representing an enlargement of a portion of Fig. 2.

Fig. 4 is a view partially in side elevation and partially in longitudinal section of the body portion only of the fitting illustrating a modification adapted for connection with a conduit nipple or other externally threaded member.

The fitting shown in Figs. 1, 2 and 3 comprises a tubular body portion or terminal tube 1 in the form of a sleeve having a stepped internal bore. One portion of the bore, designated by the reference numeral 2, has an internal diameter sufficiently great to receive the sheath of the cable for which the fitting is intended so that the sheath of the cable will slip easily through the bore and yet fit fairly snugly therein. Another portion 3 of the bore is of greater diameter to provide an annular packing recess around the sheath of the cable, the two portions of the bore being connected by a shoulder 4 which is preferably sloping, as shown in the drawings. The outer end portion of the enlarged bore is internally threaded, as indicated at 5. The opposite end of the fitting body is of reduced outside diameter and is provided externally with threads 6. The outside of the principal portion of the body is preferably provided with ribs 7 or other configuration to facilitate turning the body portion with a wrench.

An annular gland nut 10 is externally threaded at both ends, the threaded portions being indicated at 11 and 12 respectively, and is provided intermediate the threaded portions with a hexagonal or other wrench section 13. The threaded end 11 is adapted to screw into the internally threaded portion 5 of the body portion 1. The gland nut has an internal bore 14 of a diameter to slip over the sheath of the cable and yet fit fairly snugly thereon. At the end adapted to be screwed into the body portion, the inside edge of the gland nut is rounded or chamferred, as shown at 15. At the opposite end, the bore of the gland nut is countersunk to provide a bevelled space 16 forming an annular recess at the end of the gland nut.

As indicated above, the gland nut 10 is adapted to be screwed into the body 1 of the fitting to apply pressure to gaskets or packing material in the annular packing recess 3. A retainer ring 17 is preferably interposed between the end of the gland nut and the packing so that the gland nut can be turned easily without damaging the packing.

At the opposite end of the gland nut there is an armor locking ring 20 having a bevelled or frustoconical surface 21 corresponding substantially in configuration with the bevelled surface 16 of the gland nut and a short cylindrical surface 22. The internal bore 23 of the locking ring is of a diameter to fit snugly over the armor of the cable. The edges may be slightly bevelled or rounded, if desired, to remove any sharpness.

The locking ring 20 is clamped or pressed into the recess 16 of the gland nut by means of a cap or follower 25 having an internally threaded portion 26 adapted to screw on to the threaded end 12 of the gland nut and an inwardly projecting flange 27 adapted to engage the locking ring 20. The exterior of the cap 25 is preferably provided with ribs 28 or other wrench engaging portions to facilitate turning the cap.

Fig. 2 shows the fitting in assembled relationship to make a fluid-tight connection between a cable C and an outlet box or equipment enclosure B. The cable shown by way of example in the drawings has two conductors 30 covered by insulation 31 and enclosed with suitable fillers (not shown) in an impervious sheath 32. Additional layers of insulation may be provided inside the sheath, if desired. On the outside, the sheath 32 is covered with a treated convas or other fabric covering 33 and with an armor 34 which may be formed of fibre or plastic but in the form shown is composed of wire strands braided or woven into a basket-weave pattern.

In assembling the fitting to make up a connection, the threaded end 6 of the body portion 1 is screwed into a threaded opening in the wall of the enclosure B which, as indicated above, may be a waterproof outlet box, junction box, switch box, instrument casing, or other water-tight enclosure. A suitable gasket, sealing compound, solder or other means may be used to ensure that the threaded joint is absolutely fluid tight. The lead sheath of the cable is cut off at any desired point, indicated by way of example at 35, while the canvas 33 is cut back farther so that the end 36 of the canvas will lie between the two ends of the gland nut 10 when the fitting is assembled. The armor 34 is cut off at approximately the same point as the canvas or, in some instances, back a little further. The stripped end of the cable is then slipped through the body portion 1 after first slipping the other parts of the fitting on to the cable. With the cable in the position shown in Fig. 2, gasket or packing material 37 is placed in the recess 3 and the gland nut 10 is screwed in to apply pressure to the packing. The packing material may consist of a plurality of separate rings, as illustrated in the drawings. It will be noted that the packing 37 directly engages the impervious sheath 32 of the cable. By using a lead sheath and lead or other metallic packing, a direct metal to metal joint is provided. This gives an added safety feature when used on wood or similar non-conducting surfaces since it provides absolute conductivity between the fixture, the sheath and the metal armor without the use of a special wire or wires to ground the fixture, thereby preventing shock to any person touching the equipment in the event of electrical leakage and also preventing fires resulting from shorts or leakage. By using the metal basket armor to conduct the electricity to ground, it either blows a fuse or opens a circuit breaker to cut off power from the point of trouble.

The armor 34 is slipped back and the end portion of the armor is turned back over the locking ring 20, as indicated more clearly at 38 in Fig. 3. The annular follower or cap 25 is then screwed on to the threaded end 12 of the gland nut to press the locking ring 20 into the annular recess 16 of the gland nut and thereby clamp the end portion of the armor 34 tightly between the ring and the nut. The end of the armor is thereby securely locked so that the armor cannot be pulled out of the coupling to expose a portion of the sheath of the cable and place a strain on packing, thereby causing it to leak. Moreover, the fitting will support weight of cable by means of the armor on vertical installations and prevent it from being pulled out of fixture or box. When anchored in this manner the braided armor acts like a "Chinese finger" to grip and firmly support the sheath.

It will be apparent to those skilled in the art that the fitting may be modified to adapt it for many different applications. Instead of being straight, as shown in the drawings, the terminal tube 1 may be in the form of an angle or an elbow. Instead of being provided with an externally threaded portion 6, the fitting may be provided with internal threads, as illustrated in Fig. 4 where the body portion 41 corresponding to the portion 1 of Fig. 1 has an internally threaded portion 42 for making a connection with an externally threaded conduit, nipple or other member 43. In Fig. 4, only the body portion of the fitting is shown, it being understood that the rest of the fitting is the same as in Figs. 1, 2, 3. The body portion of the fitting may alternatively be joined to the enclosure by means of a brazed, soldered, welded, or other liquid-, gas-, air-, or vapor-tight joint or, in some special instances, may be made integrally with the enclosure.

Instead of turning the end of the armor 34 back over the locking ring 20, as illustrated in Fig. 3, it may in some instances be desirable to use a compressible locking ring which is forced into locking engagement with the armor of the cable when the cap 27 is screwed on to the gland nut. Still other modifications will occur to those skilled in the art.

What I claim and desire to secure by Letters Patent is:

1. A fitting for making a watertight connection between an equipment enclosure and an electrical cable of the type having an impervious tubular sheath and a flexible braided armor outside the sheath, a portion of the armor at the end of the cable being stripped back to expose an end portion of the sheath, comprising a hollow body portion, means at the inner end of the body portion for making a fluid tight connection between the body portion and the equipment enclosure, said body portion having a stepped axial bore comprising an inner end portion of an internal diameter closely to receive the exposed portion of the sheath of the cable and an adjacent enlarged outer end portion providing an annular packing recess around said sheath, an outer end portion of the body portion being threaded, an annular gland nut of an internal diameter closely to receive said sheath, said gland nut being threaded at both ends with an intermediate unthreaded portion, the threads at the inner end of said gland nut engaging the threads at the outer end of the body portion to apply pressure to packing in said packing recess and thereby provide a fluid tight seal between the body portion and the exposed portion of the sheath of the cable, an armor-locking ring of an internal diameter slightly greater than the external diameter of the armor of the cable, the end portion of the armor being flared outwardly to form an outwardly projecting annular flange lying between the gland nut and the locking ring and a clamping nut having threads engaging the threaded outer end portion of the gland nut and having a portion bearing on the locking ring to press said ring toward the gland nut and thereby clamp the out-turned end portion of the armor between the gland nut and the locking ring.

2. A fitting for making a watertight connection between an equipment enclosure and an electrical cable of the type having an impervious tubular sheath and a flexible braided armor outside the sheath, a portion of the armor at the end of the cable being stripped back to expose an end portion of the sheath, comprising a hollow body portion, means at the inner end of the body portion for making a fluid tight connection between the body portion and the equipment enclosure, said body portion having a stepped axial bore comprising an inner end portion of an internal diameter closely to receive the exposed portion of the sheath of the cable and an adjacent outer end portion of greater diameter providing an annular packing recess around said sheath, an outer end portion of the body portion being threaded, an annular gland nut of an internal diameter closely to receive said sheath, said gland nut being threaded at both ends and having an annular recess at its outer end, the threads at the inner end of said gland nut engaging the threads at the outer end of the body portion to apply pressure to packing in said packing recess and thereby provide a fluid tight seal between the body portion and the exposed portion of the sheath of the cable, an armor-locking ring having an internal diameter slightly greater than the external diameter of the armor of the cable and fitting into the recess at the outer end of the gland nut, the end portion of the armor being flared outwardly to form an annular flange which lies between the gland nut and the locking ring and is bent back over said locking ring through an angle of more than ninety degrees and a clamping nut having threads engaging the threaded outer end portion of the gland nut and having a portion that bears on the locking ring to press said ring into the recess at the outer end of the gland nut and thereby clamp the flanged end of the armor between the gland nut and the locking ring.

EUGENE FRASER.

REFERENCES CITED

The following references are of record in the file of this patent:

UNITED STATES PATENTS

| Number | Name | Date |
|---|---|---|
| 1,345,473 | Benjamin | July 6, 1920 |
| 1,904,617 | Buchanan | Apr. 18, 1933 |
| 2,150,471 | Van Volpen | Mar. 14, 1939 |
| 2,173,643 | Moser | Sept. 19, 1939 |
| 2,402,050 | Ingalls | June 11, 1946 |
| 2,449,983 | Devol | Sept. 28, 1948 |

FOREIGN PATENTS

| Number | Country | Date |
|---|---|---|
| 11,327 | Holland | Dec. 15, 1923 |
| 200,895 | England | July 19, 1923 |